(12) United States Patent
Griswold et al.

(10) Patent No.: US 7,536,639 B2
(45) Date of Patent: May 19, 2009

(54) NUMERIC/VOICE NAME INTERNET ACCESS ARCHITECTURE AND METHODOLOGY

(75) Inventors: Timothy J. Griswold, Fairfax, VA (US); William R. Dutcher, Great Falls, VA (US); Patrick J. Conley, Rochester, NY (US)

(73) Assignee: Verisign, Inc., Mountain View, CA (US)

( * ) Notice: Subject to any disclaimer, the term of this patent is extended or adjusted under 35 U.S.C. 154(b) by 1201 days.

(21) Appl. No.: 09/930,445

(22) Filed: Aug. 16, 2001

(65) Prior Publication Data

US 2002/0052912 A1    May 2, 2002

Related U.S. Application Data

(60) Provisional application No. 60/256,325, filed on Dec. 19, 2000, provisional application No. 60/231,576, filed on Sep. 11, 2000, provisional application No. 60/225,647, filed on Aug. 16, 2000.

(51) Int. Cl.
    *G06F 17/00* (2006.01)
(52) U.S. Cl. .................................. 715/234; 455/3.01
(58) Field of Classification Search ............. 715/501.1, 715/513, 234; 709/225, 226, 229, 245; 707/1, 707/6; 455/414.2, 456.3, 3.01
    See application file for complete search history.

(56) References Cited

U.S. PATENT DOCUMENTS

| | | | |
|---|---|---|---|
| 5,809,243 A | 9/1998 | Rostoker et al. | ............ 709/217 |
| 5,930,474 A | 7/1999 | Dunworth et al. | |
| 6,049,796 A | 4/2000 | Siitonen et al. | ................ 707/3 |
| 6,065,120 A * | 5/2000 | Laursen et al. | ................. 726/5 |
| 6,141,341 A * | 10/2000 | Jones et al. | ................. 370/352 |
| 6,212,265 B1 | 4/2001 | Duphorne | |
| 6,353,398 B1 | 3/2002 | Amin et al. | |
| 6,389,290 B1 | 5/2002 | Kikinis et al. | |
| 6,393,468 B1 * | 5/2002 | McGee | ....................... 709/218 |
| 6,477,579 B1 | 11/2002 | Kunkel et al. | |

(Continued)

OTHER PUBLICATIONS

Acharya, Arup, et al., "A Framework for Delivering Multicast Message in Networks With Mobile Hosts", Mobile Networks and Applications, vol. 1, Issue 2, Oct. 1996, pp. 199-219.

(Continued)

*Primary Examiner*—Laurie Ries
(74) *Attorney, Agent, or Firm*—Townsend and Townsend and Crew LLP

(57) ABSTRACT

A system that provides users of both fixed and wireless Internet devices, a method of entering numbers instead of the text characters of Internet Uniform Resource Locators (URLs) and other Internet identifiers to access Internet resources and functions, such as Web sites, e-mail services, individual documents or files, location services, etc. When the user enters a WebNum, the digits of the WebNum are sent to a database on a system that is accessible over the Internet. The database maps the WebNum back to a Uniform Resource Locator (URL), which contains a hostname in the Internet domain name structure. This would subsequently be resolved through the Internet Domain Name System (DNS) to an IP address to identify the IP address of the Web site. The cell phone provider or WID network provider would then retrieve the home page of the Web site over the Internet, to return content to the cell phone or WID display.

65 Claims, 4 Drawing Sheets

U.S. PATENT DOCUMENTS

| | | | |
|---|---|---|---|
| 6,496,692 B1 * | 12/2002 | Shanahan | 455/418 |
| 6,542,813 B1 | 4/2003 | Kovacs | |
| 6,577,907 B1 | 6/2003 | Czyszczewski et al. | |
| 6,635,088 B1 | 10/2003 | Hind et al. | |
| 6,643,707 B1 * | 11/2003 | Booth | 709/245 |
| 6,687,242 B1 * | 2/2004 | Enzmann et al. | 370/352 |
| 6,708,214 B1 * | 3/2004 | La Fleur | 709/226 |
| 6,738,630 B2 * | 5/2004 | Ashmore | 455/456.3 |
| 6,766,363 B1 * | 7/2004 | Rothschild | 709/219 |
| 6,829,233 B1 * | 12/2004 | Gilboy | 370/352 |
| 6,842,612 B2 * | 1/2005 | Kalish et al. | 455/414.2 |
| 6,895,234 B1 * | 5/2005 | Laursen et al. | 455/403 |
| 6,937,869 B1 | 8/2005 | Rayburn | |
| 6,980,331 B1 | 12/2005 | Mooney et al. | |
| 2001/0047391 A1 | 11/2001 | Szutu | |
| 2003/0097361 A1 | 5/2003 | Huang et al. | |

OTHER PUBLICATIONS

Imielinski, Tomasz, et al., "GPS-Based Geographic Addressing, routing, and Resource Delivery", Communications of the ACM, vol. 42, Issue 4, Apr. 1999, pp. 86-92.

Smith, Marc A., "Some Social Implications of Ubiquitous Wireless Networks", ACM SIGMOBILE Mobile Computing and Communications Review, vol. 4, Issue 2, Apr. 2000, pp. 25-36.

Ramanathan, S., et al., A Survey of Routing Techniques for Mobile Communications Networks and Applications, vol. 1, Issue 2, Oct. 1996, pp. 89-104.

* cited by examiner

NUMERIC/VOICE NAME INTERNET ACCESS ARCHITECTURE AND METHODOLOGY

RELATED APPLICATIONS

The present invention is based on U.S. Provisional Patent Applications 60/225,647 filed Aug. 16, 2000, 60/231,576 filed Sep. 11, 2000, and 60/256,325 filed Dec. 19, 2000, and claims the benefit thereof.

BACKGROUND OF THE INVENTION

The present invention is directed to a system (hereinafter referred to as "the WebNum system"), that gives users of both fixed and wireless Internet devices, a method of entering numbers instead of the text characters of Internet Uniform Resource Locators (URLS) and other Internet identifiers to access Internet resources and functions, such as Web sites, e-mail services, individual documents or files, location services, etc.

Recently, wireless devices such as cell phones and PDAs have been developed with capabilities to access the Internet. Accessing a website via a wireless device has typically been done by the user entering text characters to spell out the Internet URL. Since a phone keypad uses multiple letters for each numeric key, and since most cell phones require the user to change the mode of operation to enter letters instead of numbers, this can be a cumbersome task with a cell phone.

Some wireless devices allow users to assign graphical icons, voice commands, and/or abbreviated names to a limited number of frequently visited web sites, so that users do not have to enter the entire web address for those sites. The storage and resolution of these 'short-cuts,' however, is conducted within the wireless device and is therefore limited and non-uniform for multiple users. Thus, when a user uses a different wireless device, the user cannot necessarily use the same shortcuts that he/she has already memorized. Furthermore, this approach to short-cuts does nothing for the user who wants to access a new website for the first time.

SUMMARY OF THE INVENTION

It is therefore an object of the present invention to provide a system to allow users to more easily access the Internet from a wireless device.

In accordance with one embodiment of the present invention, the WebNum system specifies a Private Numbering System that allows users to reach Internet Web sites by entering numbers instead of text Web URLs and host names on cellular telephones and other wireless Internet devices (WID). The Private Numbering System is a unique system of using numerical digits, including specially-designated numeric combinations, standard telephone numbers, and international telephone numbers, that directs Web-enabled cell phones and WIDs to Internet Web sites and other Internet resources. A special WebNum database maps each WebNum back to an Internet URL, and interprets the WebNum as a pointer to an Internet resource.

When the user enters a WebNum, the digits of the WebNum are sent to a special database on a system that is accessible over the Internet. The database maps the WebNum back to a Uniform Resource Locator (URL), which contains a hostname in the Internet domain name structure. For example, the WebNum 877, entered by a user on a cell phone or WID, may map in the database to an Internet URL, such as http://www.xyz.com. This would subsequently be resolved through the Internet Domain Name System (DNS) to an IP address to identify the IP address of the Web site.

The cell phone provider or WID network provider would then retrieve the home page of the Web site over the Internet, to return content to the cell phone or WID display. In most cases, the content of the Web site will have been specially formatted for display on the cell phone or WID display, but such reformatting is not necessary to implement the invention. A number of cell phone and WID Web browsers and markup languages can be used, and their operation and characteristics are beyond the scope of the invention.

It is therefore another object of the invention to provide a system that allows expansion of new numbering systems and concepts that may be used in a WebNum system. For example, two of the extensions described herein allow a company or organization that has established an association with a specific WebNum to build other WebNum shortcuts from that single "root" WebNum. The third extension includes data variables in WebNum strings, so that a user may enter a WebNum and additional data variables in one step, in order to bypass a series of prompts for additional data. These extensions include Extended WebNum shortcuts, Country Code WebNum shortcuts (ccWebNum), and Power WebNum shortcuts.

DETAILED DESCRIPTION OF THE PREFERRED EMBODIMENTS

In accordance with a preferred embodiment of the present invention, the WebNum Private Numbering System provides a format for an example numbering plan, the significance of digits, numeric fields, and special numeric sequences in the numbering plan, and the system of Internet-accessible databases that interpret WebNum shortcuts.

Numeric Names

In a preferred embodiment, WebNum shortcuts are implemented as strings of digits, referred to as Numeric Names, that point Internet-enabled cell phones and WIDs to Internet sites. Numeric Names are preferably from one to sixteen digits in length, and may be any combination of digits that is unique within the WebNum system.

Numeric Names may be local or national telephone numbers, or E.164 telephone numbers that include a country code prefix. For example, a business with the telephone number of (212) 123-4567 may register the WebNum 2121234567, or the E.164 version of that number (prefixed by country code digits), which is 12121234567. In either case, the WebNum database maps the WebNum to an Internet resource, which is usually an Internet URL, such as:

12121234567=www.asdfg.com

Numeric Names are not limited to E.164 format phone numbers. Numeric Names may also be short numbers, usually from one to seven digits in length, that map to a string of alpha characters on the numeric keys of a standard telephone keypad. These might be an alpha equivalent name, such as the WebNum 877 for UPS™, where the numbers assigned also represent the alpha values on a standard telephone keypad as:

0=No Alpha equivalent
1=No Alpha equivalent
2=ABC
3=DEF
4=GHI
5=JKL
6=MNO
7=PQRS
8=TUV
9=WXYZ International language and keyboards mapping arrangements can also be accommodated using the WebNum approach. For example, in Asia, some phones have "RQ" under the 1 key. These and other variations such as using Chinese or other characters are within the scope of this invention.

WebNum System Operation

Figure 1:
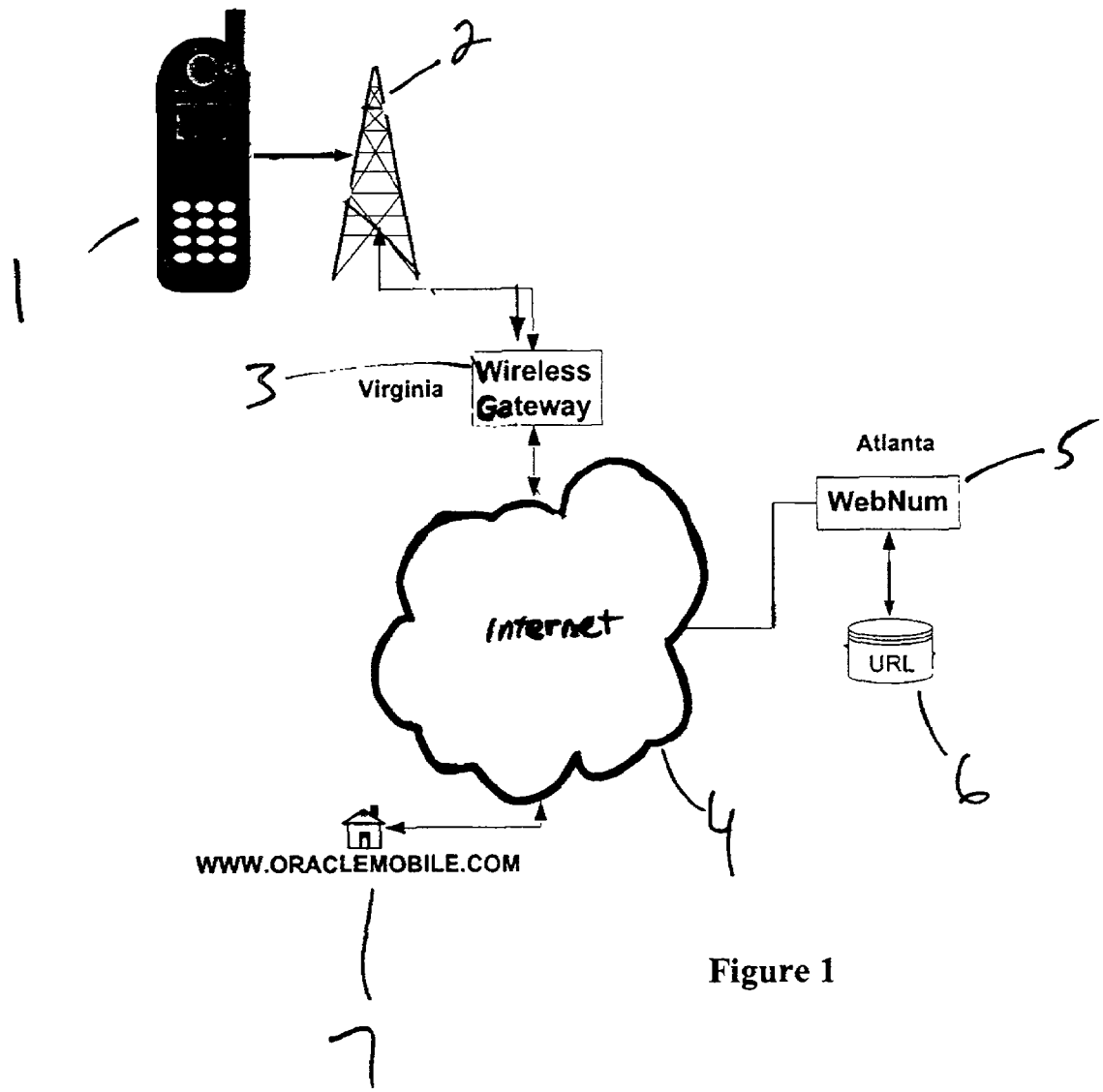
FIG. 1 is a diagram showing aspects of one embodiment of the present invention.
Figure 4:
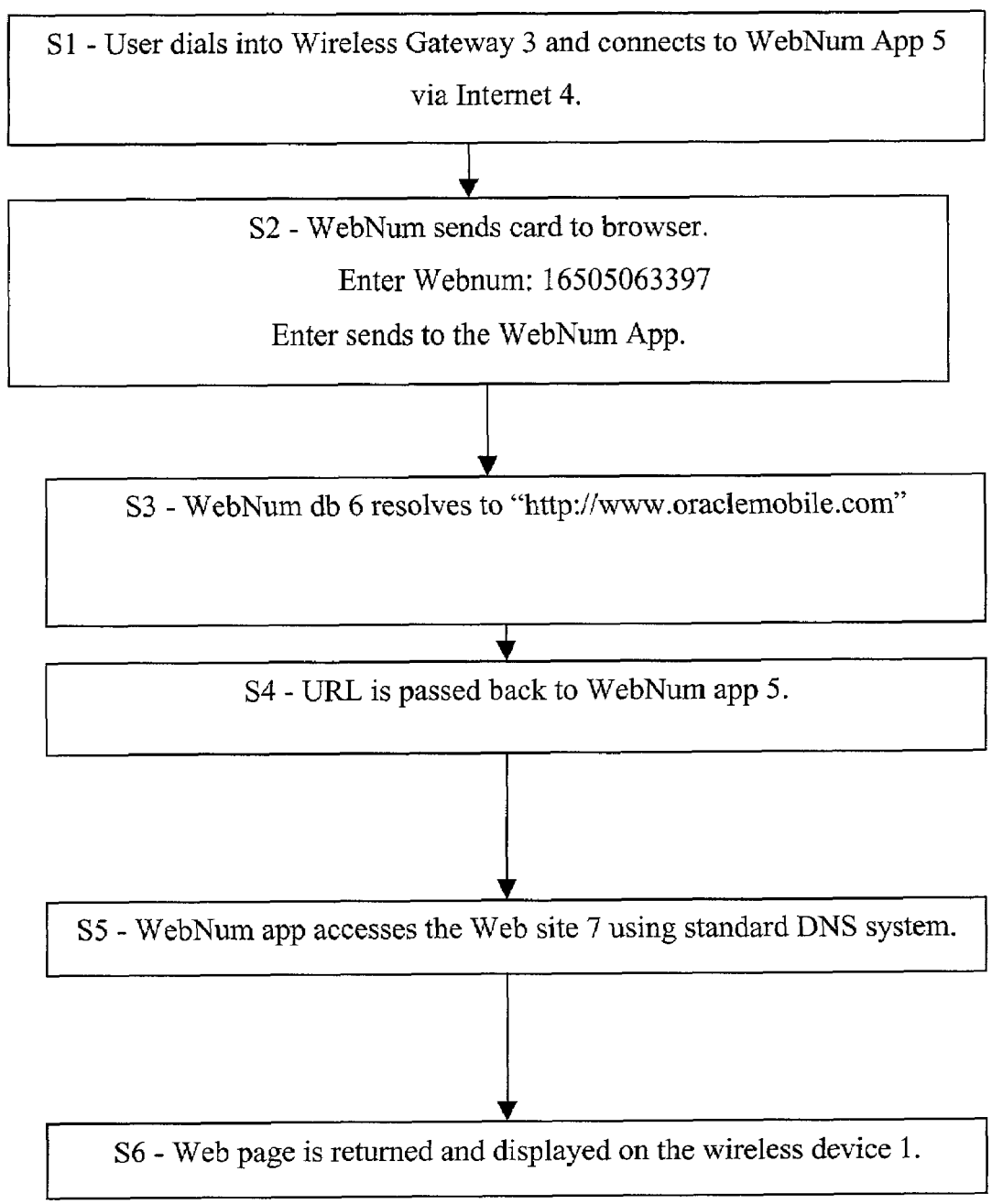
FIG. 4 is a flow chart showing a typical use of the present invention to access a website.

With reference to FIGS. 1 and 4, a WebNum entered on a cell phone or WID 1 is sent from the device to the WebNum Resolution application 5 (S1-S2), which preferably runs on a server located at the wireless service provider's gateway 3, or elsewhere on the Internet 4. The WebNum Resolution application 5 accesses either tables or a database 6 to resolve the number to an Internet URL or other identifier (S3). The translation tables and databases 6 can be local to the WebNum Resolution application 5, or accessed from a remote location.

In a preferred embodiment, the browser/cell phone 1 is aware that the number entered is a WebNum, because of how and where it was entered in the context of the cell phone's Web browser, display menus, and function buttons. The wireless system knows the identity of the cell phone that originated the transaction. The WebNum system will convert the WebNum to an Internet URL or identifier, which will point the cell phone 1 to that resource (S5-S6).

The WebNum is sent to the WebNum database server 6 at the wireless carrier or on the Internet, which maps the WebNum back to an Internet URL 7. For example, the WebNum 877 may map in the database to the URL www.ups.com, as:

877=www.ups.com

The WebNum may also be mapped to a URL for wireless Web-enabled content, as:

877=wap://wap.ups.com

In this example, the Wireless Application Protocol (WAP) is used as an example of a protocol for wireless Internet-enabled content, but the WebNum system can support other wireless display protocols, such as Compact HTML (C-HTML), i-mode, or other protocols.

Figure 3:
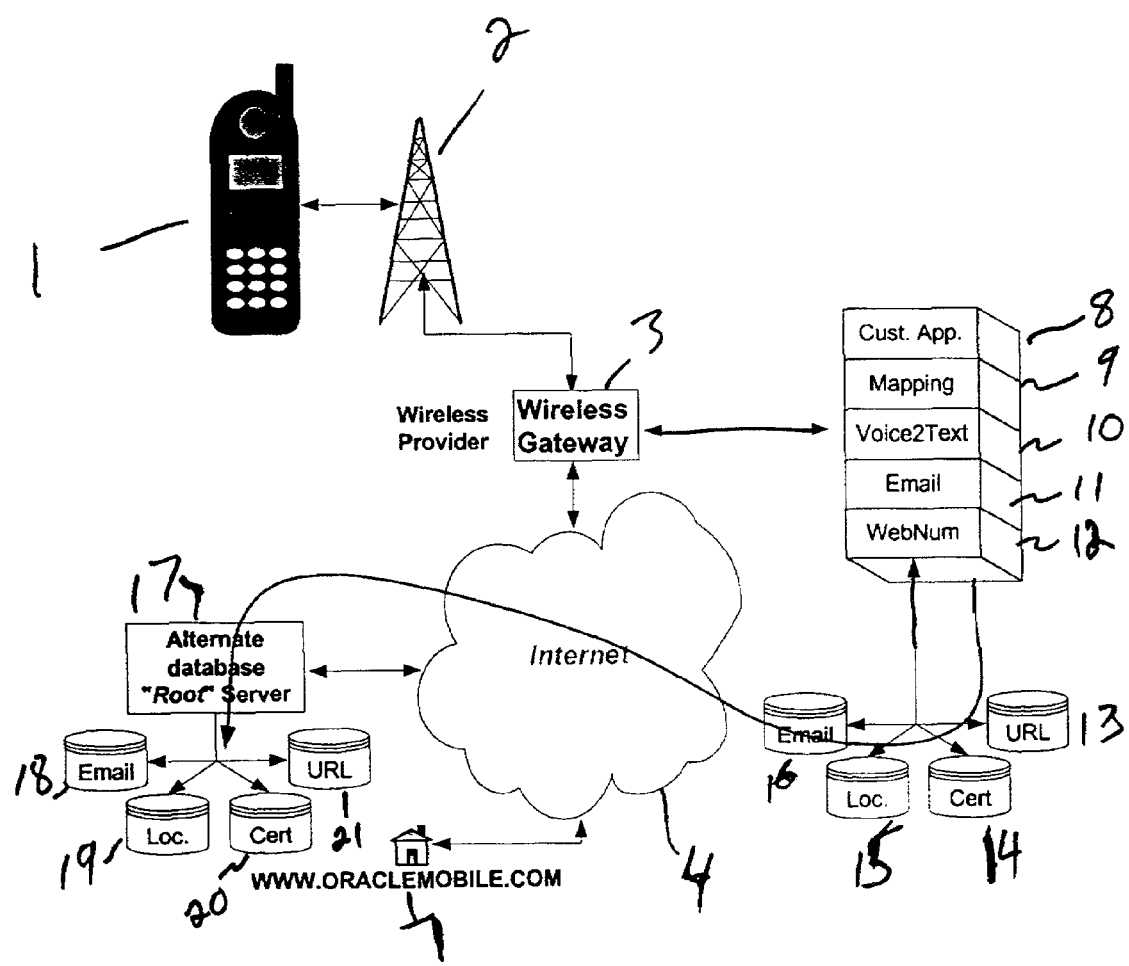
FIG. 3 is a diagram showing aspects of one embodiment of the present invention, including the use of an alternate database "root" server.

If there is no match in the local WebNum database 6, the WebNum is referred back to a central master database of all WebNum shortcuts 17 (FIG. 3). If a match is found there, the response is sent back to the WebNum Resolution application 5, where an access is made to retrieve the site using standard DNS procedures.

The fully-formed URL points to a Web site on the Internet 4, but the URL must be translated to the IP address of an Internet Web site through traditional Domain Name Service (DNS) lookup mechanisms. When the wireless switch receives the IP address resolved from its DNS resolution request, the switch creates an IP datagram, using the protocol specified in the URL, and passes the IP datagram to an Internet Service provider (ISP) for delivery on the Internet, as illustrated in FIG. 1.

In this example, the response that comes back from the Internet Web site 7 will be the wireless Internet-enabled Web home page, or, to use WAP terminology, the WAP "card". The card will be passed from the switch back to the user's cell phone display.

In this preferred embodiment, the WebNum system can hide the entire process of translating the WebNum to a URL, then resolving the IP address, then retrieving the data for the wireless Internet home page. Instead of dealing with the complexity of entering a text string on a numeric keypad, or selecting from a limited list of cell phone provider-approved Web sites, the user can go to thousands of different wireless Internet-enabled sites by pressing a few numbers on the cell phone key pad.

Increased Usability

WebNum shortcuts allow users to access Web sites supporting of wireless-enabled Web sites quickly and easily by using a simple number, such as a phone number, to access to the site. The number can be dialed on the number pad of any wireless phone, transferred from the phone's internal phonebook, entered on a wireless handheld device, or entered using a speech recognition function on a phone or other wireless device. The number is translated to an Internet URL through a database at the wireless service provider's gateway applications server, or at an application server located elsewhere on the Internet 4. The URL is resolved through traditional Internet DNS lookup and name resolution mechanisms. The home page or card of the wireless-device enabled Web site is then returned to the user's phone or wireless device 1.

Without changing the use of the simple numeric or voice references (WebNum), this system can be expanded to access other information directly from a cell phone or wireless device 1, instead of from a Web site. For example, it could be used to send and receive e-mail, get location information and directions, identify recipients of e-mail messages, or establish Voice over Internet communications. It could also be a user interface to an ENUM system that links E.164 telephone numbers to IP addresses, e-mail addresses, web sites, and other information services.

Figure 2:
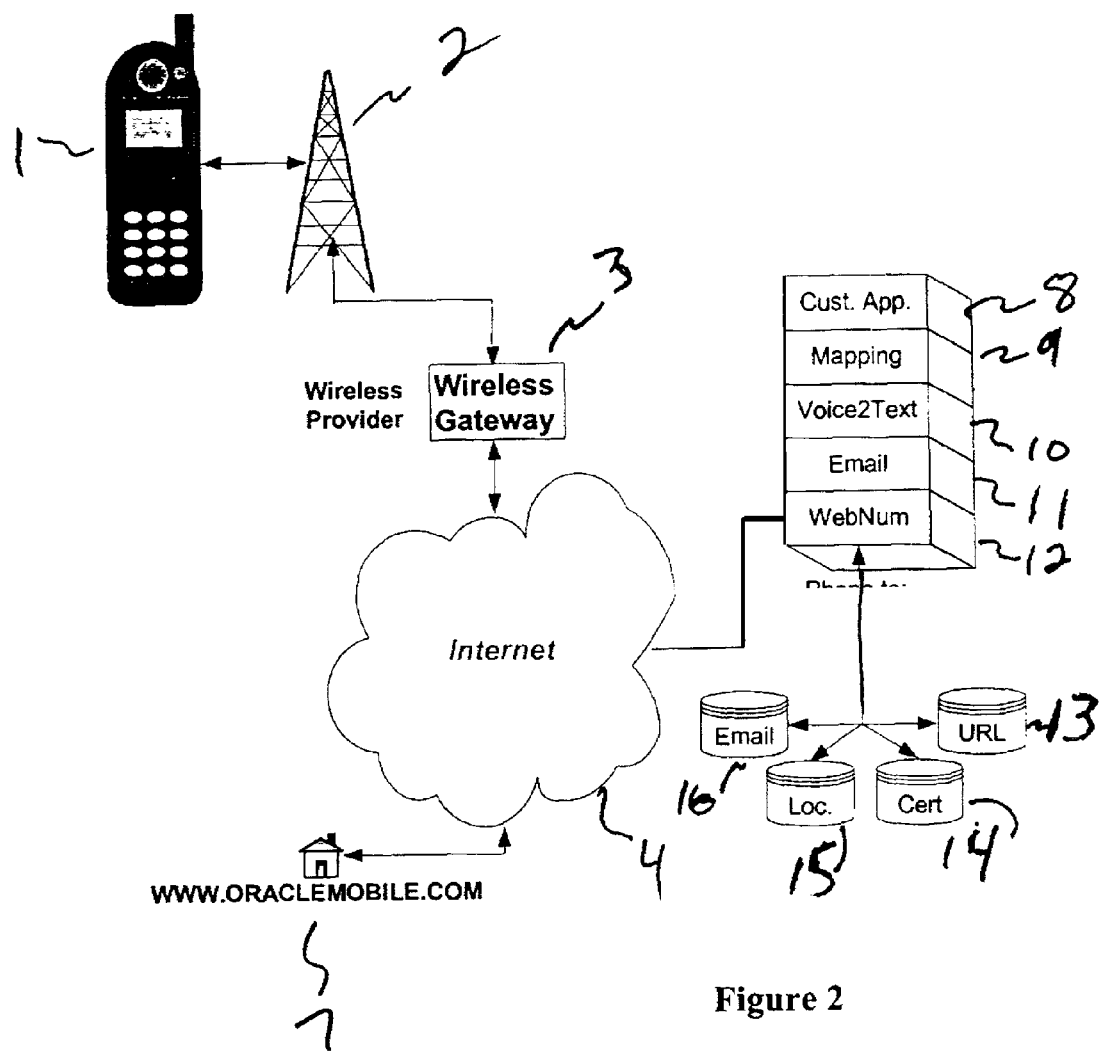
FIG. 2 is a diagram showing additional aspects of a embodiment of the present invention, including the use of additional APIs.

The subscriber can also pick a short "Voice Name" that represents common translations of a word or name that would be spoken to a wireless device 1. Examples would include words like "Etrade™", "United™" and "Amazon™." These Voice Names will also be resolved into the appropriate URL, or to another Internet locator address, as shown in FIG. 2.

For example, the WebNum system could map an E.164 phone number, 16505063397, to http://www.oraclemobile-.com. A numeric equivalent to the telephone keys that correspond to "ORACLE™" (672253) might also map to http://www.oraclemobile.com. Finally, the spoken words "Oracle Mobile" might also map to http://www.oraclemobile.com.

Databases

These relationships can be contained within one or more databases that can be local to a wireless provider's gateway 3, in a corporation's own wireless applications server, or in a database operated by a third party on an Internet server.

As with regular internet addresses, WebNum shortcuts could be the subject of a central registration process to ensure that each WebNum is unique. This approach is preferred, however, not necessary to practice the invention.

For instance, it is possible to have different WebNum service providers, each with a different access process. So for example, the WebNum 626 might be mapped by one service provider to www.XYZ.com, while another service provider maps it to www.ABC.com. In such a scenario, the user would have to know which WebNum provider he/she is using and the specific WebNum relationship within that provider.

Multiple Relationships

The WebNum system supports many-to-one relationships, in which multiple Numeric/Voice Names can be linked to a single URL, e-mail address, or other Internet resource or service. The WebNum system will also support one-to-many relationships, where a single URL can be accessed from multiple Numeric Names, alpha equivalent names, and voice names.

For example, a single URL, such as http://www.oraclemobile.com, could be accessed by entering a phone number (16505063397), a short alpha equivalent (672253). This URL or any other Internet resource might also be accessible either from a speech-to-text or speech recognition system.

Transport Protocol Independence

WebNum shortcuts can simplify the identification and support issues associated with multiple protocols. As new and enhanced wireless access and transport protocols are introduced, a new level of complexity is introduced. In order to return data to a device in the proper format, Web sites must identify the access or transport protocol of the device requesting service. This is very difficult to accomplish given the current solutions available.

In a preferred embodiment, the WebNum system assumes the role of identifying the transport protocols, e.g. WTP (Wireless Transport Protocol) or HTTP (HyperText Transport Protocol) required, and addresses the sending site in a manner that assures that the site gets the data in the correct protocol. This sender notification can be accomplished by targeting addresses based on transport protocol, or by providing interpreting instructions along with the access request being presented.

Hierarchical Data Look-Up

As shown in FIG. 3, should the number (Numeric/Voice Name) that the user requests, be untranslatable to an accessible site, the WebNum Resolution application 5 can call on an alternate database 17 that acts as the "root server." When a Numeric/Voice Name is not found in the "local" database 6, the WebNum Resolution application 5 will formulate an inquiry, and attempt to locate the desired data in a WebNum "root" database 17.

Note that in this embodiment, the "root" database 17 is not the "./" root defined in the DNS structure. It is referred to as a "root" database only to indicate the type of functionality available from this database.

If no record is found that provides the user with the service or address requested, an appropriate "not found" message can be returned to the requesting device.

Extensions

The WebNum concept can be extended to other types of applications, and other types of interfaces, while leaving the underlying WebNum technology, concepts, and ideas intact. For example, as shown in FIGS. 2 and 3, APIs 8-12 could interface upon request with the appropriate database 13-16, to return e-mail addresses, geographic location information, or a number of other identifiers to the cell phone or WID user 1.

Email WebNum Access

The WebNum concept could be extended to send an e-mail, by having the lookup in the WebNum database return an e-mail address mapped to the WebNum. Either one or a number of e-mail addresses could be returned as a result of the lookup of the WebNum in the database. The number of email addresses returned would depend on what has been configured in the WebNum database to map back to the WebNum. The e-mail addresses would be displayed on the cell phone or WID 1 in the To:, CC:, or BCC: fields as appropriate. The user could then pick which one he wanted to use, and the cell phone would use the WebNum-mapped e-mail address as the address for the e-mail message.

Geographical Location

The WebNum concept could be extended to provide cell phone users with geographic location information, driving directions, and other location information. This capability would use the same type of WebNum identifier to access the system through a cell phone or WID, but geographic information would be returned instead of a Web site.

This type of capability is most useful with a new generation of cell phone hardware that incorporates position-sensing hardware, as mandated by the Federal Communications Commission (FCC) for use in locating cell phone users for 911 services. This capability would be used in conjunction with WebNum shortcuts to provide location sensing and directional information to cell phone users.

For example, a cell phone user in his car might select a WebNum menu option for "Directions", then enter on the cell phone keypad the phone number of the office or location he is trying to find. The phone number would go to the cell phone provider's switch, which would translate the phone number to a hostname, then to an address, which would then be referred back to a GeoLocation (GeoLoc) database 15. The GeoLoc positioning information would be sent back to the switch, and displayed, or a voice processor would "speak" driving directions back to the driver through the phone to direct him to the office or location.

Voice Input to WebNum Shortcuts

While the WebNum system is primarily a number-to-Internet resource mapping system, it can also be accessed by using voice commands. WebNum shortcuts support both numeric and voice access to these resources through a set of databases that map either a number, Numeric Name, or a Voice Name to (referred to as Numeric/Voice Name(s)) to URLs, e-mail addresses, location information, security capabilities (e.g., PKI certificates), fax machines, and/or Uniform resource Identifiers (URIs). These databases may also contain short text names that map spoken names that are generated either by voice-to-text or speech recognition systems.

The WebNum system could thus be enhanced to eliminate the requirement for the user to press buttons to enter a WebNum. Instead, the user could speak the number or name of the company whose wireless Internet Web site he was trying to access, or its WebNum, into the phone. A voice recognition application would parse the speech, and create the numeric or name WebNum, and pass that information back to the WebNum database. The Voice WebNum would be processed as a standard WebNum database inquiry, resolved to an Internet wireless Web site IP address, and the content passed back to the user's cell phone display 1.

ENUMs

The Internet Engineering Task Force (IETF) has proposed a system of universal identifiers, based on standard telephone numbers, which could be tied back to a number of other identifiers, such as Web sites, e-mail addresses, phone numbers, fax numbers, etc. through DNS address resolution. The current ENUM proposal is to use E.164 phone numbers, which are multiple digit (usually ten-digit) numbers, plus a country code designator.

If such a system is implemented, an ENUM could be used as a WebNum, which would be interpreted by the back-end switch database, and resolved to IP addresses and other identifiers through traditional DNS address resolution procedures. The cell phone provider could then create Internet requests for Web sites, e-mail systems, and other information, based on the ENUM identifiers resolved by the inquiry.

The short, numerical WebNum identifier could also be translated to an ENUM, leaving intact the original technology, concepts, and ideas of WebNum shortcuts. For example, the service provider, or the provider of the WebNum database, could expand the WebNum entered from a cell phone into an equivalent E.164 number, which could then be processed as if it had been entered as a complete ENUM. This would require that there be a separate country code assigned either to the service provider or to the database provider, so that a WebNum could be expanded to a fully-qualified, universally recognized E.164 number, before resolution to a Web site address or other identifier.

Virtual Private Networks

WebNum shortcuts can also be used create a Virtual Private Network (VPN), by coupling the Numeric Name with a separator character (i.e. * or #) followed by an additional numeric field that can be used to further qualify selection.

The Numeric Name field will be used to specify the domain that will be accessed. Typically, this will be a second-level domain name, but it could be a URL or data source location address.

EXAMPLE

```
nnnn#123456
 |    |    |
 |    |    |
 |    |    |
 |    |    123456    Record identifier that can be used as a 3rd level
 |    |              domain or other means to specify the
 |    |              information or service to be provided
 |    |
 |    |
 |    #    Separator
 |
 |
 |
 nnnn    Identifies the 2nd level Domain, URL or data source locator.
         The qualifier can be used to specify the data to be returned
         or the service to be provided. Some examples include: as a
         third level domain name, an internal phone number, to
         identify individual pages, records, or files that are to be
         returned to the wireless device,
```

Secure Virtual Private Networks

In accordance with another aspect of a preferred embodiment, WebNum shortcuts can be used to create a Secure Virtual Private Network (SVPN) by incorporating support for a PKI certificate. This will allow individual users to be authenticated and the transmissions to be encrypted.

API (Applications Program Interface)

In accordance with another aspect of a preferred embodiment, the WebNum system can contain a series of standard APIs that can allow custom program development that incorporates and extends the WebNum concept to additional applications and customer specific environments.

Private Numbering Plan

WebNum shortcuts may take several different forms. However, the cell phone or WID system, and the database that maps WebNum shortcuts to Internet URLs, should preferably treat each of the different forms in the same way. In a preferred embodiment, the general form of a WebNum is:

WebNum<Escape sequence><WebNum
      extension><Send>

In this embodiment, the meaning of these fields is:
   WebNum—These are the digits of the base or "root" WebNum.
   Escape sequence—Escape characters, such as the star key (*) or the pound (#) key, may also be included in the WebNum as an escape sequence. The escape characters are optional, but if used, they indicate the start of different fields within the WebNum. The additional fields are interpreted by the WebNum database resolver.
   Send—The cell phone or WID Send button, which may be designated the Talk, Go, or other button, indicates the end of the WebNum sequence.

The generalized processing sequence performed by the cell phone system is:
   The WebNum in its entirety, except for the terminating <Send> command, is identified as a string to be sent back to the Internet URL of the WebNum database.
   The Send key indicates that whatever key sequence was entered should be sent the WebNum database 5 for resolution.
   The database may interpret the parts of the WebNum differently, depending on how many digits of the number have been entered, and the location, type, and number of escape characters that have been included in the WebNum sequence. The generalized processing sequence performed by the WebNum database 6 is:
   The WebNum is mapped to its pre-defined URL entry in the WebNum database 6.
   If present, the escape sequence indicates a WebNum extension.
   The WebNum extension is an additional numeric sequence that is also mapped to an Internet URL in the database.

WebNum Numbers

In a preferred embodiment as discussed above, the basic WebNum is a string of digits from one to 16 digits in length, that does not include any extensions or escape sequences. WebNum shortcuts may be E.164 telephone numbers, which are numbers from eight to 12 digits long, or they may be strings of digits from one to seven digits in length.

One type of WebNum is an E.164 number, which in the United States is a eleven-digit phone number of the form <1> <area code> <exchange> <extension>, such as 1-212-123-4567. The E.164 numbering plan is a standard for international public telephone numbering that has been established by the International Telecommunication Union (ITU). In this example, 1 is the country code for the United States. A U.S. E.164 number may be entered as a WebNum as an eleven digit number, as:

1 212 123 4567 <Send>

As with any other WebNum, the numeric characters in the WebNum field would be sent to the WebNum database, to be resolved to the text of an Internet host, then converted to an Internet URL, and then resolved to an IP address through Internet DNS name resolution.

WebNum shortcuts may also be telephone numbers that are not preceded by country codes. In the example above, the phone number 212-123-4567 could also be registered as WebNum 2121234567.

Global Numeric Names

Short numeric strings may also be registered as WebNum shortcuts. They are referred to as Global Numeric Names or Global Logo Numbers, although there is not necessarily any correspondence between the standard letter pattern on telephone keys and the words or phrases that the numbers of a WebNum "spell".

For example, say that the XYZ Corporation registers the WebNum 626, and maps it to the URL of the company's Web site. The mapping in the WebNum resolution database would be:

626=http://www.xyz.com

Any user who entered the WebNum of 626 would be taken to the www.xyz.com Web site, after it was resolved to the appropriate IP address through a standard Internet DNS lookup by the cell system or WID network provider.

WebNum Extensions

In another aspect of a preferred embodiment, the interpretation of a one-to-16 digit WebNum may be modified by adding an escape sequence and additional digits to the base WebNum, to create Extended WebNum shortcuts.

Extended WebNum Shortcuts

Extended WebNum shortcuts extend a basic WebNum with additional digits, while still retaining the significance of the basic WebNum. In a preferred embodiment, an Extended WebNum consists of a base, or "root" WebNum, followed by an escape character, and one to 16 additional digits. Extended WebNum shortcuts according to one embodiment are of the form:

WebNum <escape character><additional digits>

The purpose of Extended WebNum shortcuts is to allow the registrant of a WebNum to add additional WebNum shortcuts that are based on that same root WebNum. The alternative for a registrant who wants several WebNum shortcuts is to use different and potentially unrelated WebNum shortcuts.

For example, say the XYZ Company has registered the Global Numeric Name of 626 as its WebNum. The 626 WebNum is short and easy to remember, but it only points to one Web site, or to one part of a Web site. The company would like to use additional WebNum shortcuts, but easily associated WebNum shortcuts, such as 6261, 6262, 6263, and so on, may not be available.

Extended WebNum shortcuts solve this problem by extending the 626 "root" WebNum. For example, the root WebNum may be extended if a user at a cell phone or WID keypad enters the root WebNum, an escape character (#), and additional digits designated by the registrant. Each "extended" WebNum must have previously been registered in the WebNum resolution database, and mapped to a Web site.

For example, the root WebNum and a number of Extended WebNum shortcuts may be listed in the WebNum database as:

626=http://www.xyz.com

626#1=http://www.xyz.com/sales

626#2=http://www.xyz.com/admin

626#3=http://www.xyz.com/customerservice

626#4=http:/www.abcdef.com

Note that there is no requirement that Extended WebNum shortcuts map to Web sites to which the other Extended WebNum shortcuts in the same series map. The mapping of all WebNum shortcuts is determined by the WebNum registrant.

The cell phone or WID network provider handles an Extended WebNum just like any other WebNum. The entire string is sent to the WebNum resolution database, where it is resolved to an Internet URL. The URL is resolved to an IP address through DNS lookup by the network provider, and the content of the site returned to the screen of the cell phone or WID.

The Extended WebNum system according to this embodiment does not limit the number of digits that may follow an escape character embedded in the WebNum field. Furthermore, there is no limit in this embodiment to the number of escape characters that may appear in an Extended WebNum. Each escape character would be interpreted as a delimiter for an additional qualifying field, as:

626#1#2=http://www.xyz.com/sales/pricing

There is no technical restriction in this embodiment on the number of digits in a WebNum or its length. The length of a standard or Extended WebNum is only restricted by the user's ability to remember and enter correctly all of the digits and escape characters of a WebNum.

Country Code WebNum Shortcuts

Country Code WebNum shortcuts (ccWebNum), also known as Local Logo Numbers, are variations of Global Numeric Names. In a preferred embodiment, ccWebNum shortcuts are short numeric strings that begin with a 0 (zero). These ccWebNum shortcuts are converted (extended) within the WebNum Resolution application to include the telephone country code or some other unique identifier to indicate the country of origin. This allows each country to have a unique set of WebNum shortcuts. ccWebNum shortcuts are Extended WebNum shortcuts, in that they extend the number of available WebNum shortcuts for special purposes. They may also be used to create WebNum shortcuts that are relevant to users whose Web user population mostly resides in a single country. ccWebNum shortcuts also may appeal to users whose Web sites users are primarily in a specific country, who want to give a country-specific indicator to a WebNum, or to WebNum registrants who find that a WebNum that they want is not available. By expanding the WebNum space, ccWebNum shortcuts increase the potential usage of the WebNum system.

In this embodiment, ccWebNum shortcuts use an initial numeric sequence, which is part of the ccWebNum, to indicate a country-specific WebNum, followed by a separator character, and then a WebNum. The entire numeric and special key separator string becomes the whole ccWebNum, and points to a specific URL.

In this embodiment, the URL referred to by a ccWebNum may point to a Web site in any domain, not just an Internet country code domain corresponding to the numeric country code. There is not necessarily any correspondence between a ccWebNum and Internet country code domain names, such as the .us, .jp, or .se country code domain names. ccWebNum shortcuts may point to a Web site URL in any domain.

ccWebNum Components and Resolution

For example, in a preferred embodiment, the initial ccWebNum sequence is a three-digit sequence which is either 001 or 011, followed by the telephone country code, which is referred to as the "ccRoot". Those digits are followed by a separator character (#), then a ccWebNum of from one to 16 digits. When the ccWebNum string is resolved in the Web-Num Resolution database, it will point to a specific Web site, just like any other WebNum.

In this embodiment, ccWebNum shortcuts use the standard ITU telephone country codes to indicate the ccWebNum numbering space in which the WebNum resides. For example, in the ITU scheme, the United States' country code is 1, that of Brazil is 55, and that of Hong Kong is 852. ITU country codes may be one, two, or three digits long. The ITU country code numbering scheme also includes extra digits for certain city codes within some countries. The ccWebNum system according to this embodiment uses only the country codes, and not city codes.

For example, take a ccWebNum for Brazil, which uses the 55 country code. Users in Brazil may use either a ccWebNum or a standard WebNum to go to a Web site in Brazil, but a specific site in Brazil may advertise its ccWebNum instead of a standard WebNum.

Let's say a WebNum registrant in Brazil registers the ccWebNum 0272945 (0BRAZIL), and points the ccWebNum to the Web site URL wap.xyz.br. The record in the WebNum Resolution database might be:

| ccRoot | ccWebNum | URL |
|--------|----------|-----|
| +55 | 0272945 | wap.xyz.br |

A user in Brazil could access the site by simply entering 0272945. Users outside of Brazil, anywhere in the world, could use this ccWebNum. As with any WebNum, the user would have previously bookmarked the WebNum resolution database Web site on his or her WID. Once the WID was pointed to the WebNum Resolution site, the user could enter the following WebNum sequence:

+550272945

Note that in this embodiment a ccWebNum must be preceded by +55, even though those three leading digits are not registered as part of the ccWebNum. The entire string would be sent from the WID to the WebNum Resolution database, just like any other WebNum. The WebNum Resolution database would parse the string into its component pieces and resolve the ccWebNum to a URL. The WebNum Resolution database would be able to identify the number as a ccWebNum because the entire string starts with the reserved "+" sequence. Alternatively, a single pound sign (#) or other character could be embedded in the string to indicate or terminate the ccRoot, and/or indicate the start of the ccWebNum.

So, the WebNum Resolution database would parse the ccWebNum string into its parts, which are:

+—ccWebNum indicator sequence

55—cc for Brazil country code WebNum space

0272945—ccWebNum within the 55 ccRoot space

The WebNum Resolution database would return to the WID gateway a referral to whatever Web site URL had been specified by the registrant.

Note that while ccWebNums are intended to be used for country-specific Web sites, there is not necessarily any requirement that a ccWebNum point to a Web site in the country that corresponds to the ccRoot. In the example used above, the registrant of the ccWebNum 0272945 may point it to wap.xyz.com, www.xyz.org, or to any other Web site URL. ccWebNums will be perceived to imply that they point to nation- or location-specific Web sites, but they do not necessarily have to do so.

ccWebNums may also be registered by users in the United States, using the ITU country code "1" for the United States as the ccRoot, followed by a ccWebNum. For example, a registrant in the United States may register the ccWebNum 0999, and point it to any Web site URL, such as www.xyz.com. To get to this site, a WID user outside of the US would enter the following string:

+10999.

The WebNum Resolution database would parse this sequence as:

+ - ccWebNum indicator sequence
1 - cc for United States country code WebNum space
0999 - ccWebNum within the 1 ccRoot space As in the previous examples, the WebNum Resolution database would return to the WID gateway a referral to whatever Web site URL had been specified by the registrant.

ccWebNums and Extended WebNums

The ccWebNum addressing space may be further extended by combining ccWebNums with Extended WebNums. This would allow registrants of ccWebNums to expand a basic ccWebNum into additional WebNums, by using the Extended WebNum concept described elsewhere in this document.

For example, take the Brazil ccWebNum in the first example, 0272945. Extended WebNums could be created under the +550272945 ccWebNum by adding a second separator, followed by the digits of one or more Extended WebNums. As with standard Expanded WebNums, each Expanded WebNum within a specific ccWebNum would also be resolved to a single URL.

Say that the registrant of the ccWebNum 0272945 wanted to register several other WebNums that each used 0272945 as the first part of the ccWebNum, but each of which mapped to a different URL. In this case, the basic ccWebNum, and the Extended WebNums created off that ccWebNum, as well as their corresponding URL mappings, might be:

| | |
|---|---|
| 0272945 | http://wap.xyz.br |
| 0272945#1 | http://wap.xyz.br/sales |
| 0272945#2 | http://www.xyz.com |
| 0272945#3 | http://www.def.com |

To use any of these ccWebNums, a cell phone or WID user outside of Brazil, would enter the ccWebNum, preceded by the +55 ccWebNum indicator sequence, as:

+550272945#1

The WebNum Resolution database would parse the entire string as:

+ - ccWebNum indicator sequence
55 - cc for Brazil country code WebNum space
0272945 - ccWebNum within the 55 ccRoot space
- second terminating the "root" ccWebNum, and starting an Extended WebNum
1 - Extended WebNum within the 55#272945 ccWebNum space As with ccWebNums themselves, Extended WebNums within each ccWebNum space would also represent different WebNums.

Power WebNum Shortcuts

The WebNum Resolution system can accommodate WebNum "power users", who will be able to enter a WebNum followed by another number that is variable data that is to entered on the target Web site. The objective of the power user function, referred to as Power WebNum shortcuts, is to allow WebNum users to get to Web sites and retrieve data in one step, instead of responding to one or more successive data entry prompts.

For example, a user of a WID may want to go to the Web site for Delta Airlines™, and inquire about the status of Flight 815. The normal sequence would be for the user to enter a WebNum for Delta Airlines™, which would return the home page for Delta's Web site. The Web site content would have to have been formatted for the browser type and markup language used by the cell phone or WID, but that does not affect the operation of the WebNum system. Assuming that the Delta Web site permitted the user to enter a flight number, the user could then enter the flight number to determine the flight status. The flight status would be returned by the Delta Web site to the WID.

The WebNum power user function would let the user enter the WebNum and the flight number in a single step, skipping the need to wait to be prompted for the flight number in a separate data entry screen. The WebNum Resolution system would recognize the number entered as a WebNum followed by data, and return the URL and an extension containing the data part as an argument to the cell phone or WID network gateway.

In this embodiment, Power WebNum shortcuts are not a separate class of WebNum shortcuts. Instead, they are WebNum shortcuts with data appended to them. Like other WebNum shortcuts, they are mapped to Internet URLs. Any type of WebNum, including Global Numeric Names, ccWebNum shortcuts, and Extended WebNum shortcuts, may be combined with data by a power user. However, as noted below, the URL must be able to make use of the appended data for the power user WebNum capability to work.

For example, using the airline flight information example above, say that Delta Airlines had registered the Global Numeric Name WebNum of 33582 (DELTA). When it registered the WebNum, the airline mapped the WebNum to the URL of a Web site. In order to permit a power user to retrieve flight status for Flight 815 from the site, Delta would have mapped the WebNum to the URL of the site's flight information page. The mapping in the WebNum Resolution database might be:

33582=http://www.delta-air.com/servlist/wireless/
       flightinfo.cgi?flight=

A power user would be able to enter the WebNum and the flight number at the same time, separating the two with a star (*) character as a separator, as:

33582*815

The WebNum Resolution system would parse the string as:

33582-WebNum for www.delta-air.com/servlist/wireless/
   flightinfo.cgi?flight=
    * - separator between WebNum and data
    815 - data to be appended to URL and sent to WID gateway The WebNum Resolution database application would append the data to the URL, and return it to the WID gateway as a referral to the Web site, as:

http://www.delta-air.com/servlist/wireless/
      flightinfo.cgi?flight=815

Assuming that this was the correct format for an inquiry on the Web site, the Web site would return information on Flight 815 to the cell phone or WID display.

Assuming the URL mappings in the WebNum resolution database are correct, the system would work properly even if the user did not append variable data to create a power WebNum. If the user entered only the WebNum, without following the WebNum with variable data, the URL would point to the Web site, which would be returned to the cell phone or WID display. The user could then enter the flight number in a second step. This number would be returned to the Web site, not the WebNum Resolution database, to get information about the flight number.

Note that Power WebNum shortcuts depend on the WebNum registrant having specified the URL for the WebNum correctly. In addition, changes in syntax or composition of the URL must be updated by the registrant on the WebNum registration database.

Power WebNum Shortcuts and Other Types of WebNum Shortcuts

The example above shows how Power WebNum shortcuts work with a standard Global Numeric Name WebNum shortcuts. However, Extended WebNum shortcuts and ccWebNum shortcuts will also work with power user functions. WebNum registrants that expect users to use Power WebNum shortcuts may register either several standard WebNum shortcuts or a number of Extended or ccWebNum shortcuts, so that all of the registrant's WebNum shortcuts have the same numeric "root".

For example, Delta Airlines could register 33582 as its Global Numeric Name, and point the URL to the home page of its Web site, which might be www.delta-air.com. However, in order to accommodate both regular WebNum and Power WebNum users who want to retrieve different types of information about Delta flights, the company may decide to register a number of Extended WebNum shortcuts off that root WebNum for that purpose.

For example, the company could register the following Extended WebNum shortcuts, in addition to the root WebNum, and point them to different URLs:

33582 = http://www.delta-air.com
    33582#1 = http://www.delta-air.com/servlist/wireless/
   flightinfo.cgi?flight= (flight status)
    33582#2 = http://www.delta-air.com/servlist/wireless/
   gateinfo.cgi?flight= (flight arrival gate)
    33582#3 = http://www.delta-air.com/servlist/wireless/
   arrivalweather.cgi?flight= (arrival city weather)
    33582#4 = http://wap.delta-air.com/businessnews In these examples, the Extended WebNum shortcuts 33582#1, 33582#2, and 33582#3 point to URLs that require additional variable data (for the sake of simplicity in this example, in each case the variable data is a flight number). A user may enter the flight number when the page for that URL is displayed. A power user could enter the WebNum and the data to get the status of Flight 815 in one action, as:

33582#1*815

The WebNum Resolution system would parse the character string as:

```
33582#1 - Extended WebNum for www.delta-air.com/servlist/
wireless/flightinfo.cgi?flight=
    * - separator between Extended WebNum and data
    815 - data to be appended to URL and sent to cell phone or WID
    network gateway
```

Power user functions will also work with ccWebNums, which may be considered to be versions of Extended WebNums. For example, for use in the United Kingdom (ITU country code 44), Delta could register the root ccWebNum 033582, as well as a number of Extended WebNums under that ccWebNum, and point them to different URLs, as:

```
033582 = http://www.delta-air.com.uk
033582#1 = http://www.delta-
air.com.uk/servlist/wireless/flightinfo.cgi?flight= (flight status)
033582#2 = http://www.delta-
air.com.uk/servlist/wireless/gateinfo.cgi?flight= (flight arrival gate)
033582#3 = http://www.delta-
air.com.uk/servlist/wireless/arrivalweather.cgi?flight= (arrival weather)
033582#4 = http://wap.delta-air.com.uk/businessnews
```

In these examples, as in the examples of Extended WebNums above, ccWebNums 033582#1, 033582#2, and 033582#3 point to URLs that require a flight number. A user may either enter the flight number when the WAP screen for that URL is displayed, while a Power WebNum user outside of the UK, could enter the ccWebNum and the data to get the status of Flight 815 in one action, as:

+44033582#1*815

Note that in this embodiment, because this is a ccWebNum, it is preceded by +44. The WebNum Resolution system would parse the WebNum character string as:

```
+ - ccWebNum indicator sequence
44 - ccWebNum+ for United Kingdom country code WebNum space
+
033582#1 - Extended WebNum for www.delta
air.com.uk/servlist/wireless/flightinfo.cgi?flight=
    * - separator between Extended WebNum and data
    815 - data to be appended to URL and sent to WID gateway
```

As has been discussed in the section of this document on ccWebNums, the URLs referenced by ccWebNums do not necessarily have to point to Web sites in the same country as the country code "root". In the example above, the URLs mapped to the 033582 Extended WebNums could have pointed to Web sites anywhere.

In accordance with a preferred embodiment of this invention, WebNum shortcuts are designed to simplify and speed access from devices with limited input capabilities, such as cell phones and other wireless devices that have numeric keypads and pen-based input, as well as speech-to-text and speech recognition systems. While the primary emphasis is on wireless and other devices with limited input functions, the function and benefits described are also available for other web-enabled devices such as fixed Internet devices, personal computers, etc . . . .

As used in the appended claims, the term "controller" could be implemented as a single computer or multiple computers, one or more microprocessors, one or more servers, one or more database controllers, or other like system.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for accessing internet addresses based on a request from a wireless device, the method comprising:
   receiving a short-name associated with a particular internet address of a website that a user of the wireless device desires to access from said wireless device, said short-name comprising a root number corresponding to the website;
   searching a database for said short-name, said database being located at a location remote from said wireless device; and
   if said short-name is found, retrieving said particular internet address so that said wireless device can be connected to said particular internet address,
   wherein said short-name further comprises a non-numerical separator character and an extension number, said separator character separating said root number from said extension number.

2. A method according to claim 1, wherein said database is accessed over the internet.

3. A method according to claim 1, wherein said database is accessed through a wireless service provider without traversing the internet.

4. A method according to claim 1, wherein said short-name is received by a software application that queries said database.

5. A method according to claim 4, wherein at least one of said software application and said database maps said short-name to an internet URL.

6. A method according to claim 1, wherein multiple short-names can map to a single internet address.

7. A method according to claim 1, further comprises:
   identifying a transport protocol required to complete said accessing; and
   addressing a sending site in accordance with said transport protocol.

8. A method according to claim 1, further comprising:
   if said database indicates that said short-name is not found, searching a second database for said short-name.

9. A method according to claim 1, further comprising a plurality of databases, said databases arranged in a logical hierarchy so that if said short-name is not found a first database, said searching is resubmitted to a next database in said hierarchy.

10. A method according to claim 1, wherein said short-name is input to said wireless device in the form of voice command, and said voice command is converted to a non-voice command after being transmitted by said wireless device.

11. A method according to claim 10, wherein said voice command is converted to a non-voice command by a computer connected to said wireless device via a network.

12. A method according to claim 1, wherein said root number corresponds to a phone number in E.164 format.

13. A method according to claim 1, wherein said root number corresponds to a phone number.

14. A method according to claim 1, wherein said root number corresponds to an address of the website and said extension number corresponds to a sub-address of the website.

15. A method according to claim 1, wherein said short-name comprises multiple separator codes and multiple extension numbers.

16. A method according to claim 15, wherein at least one of said extension numbers corresponds to variable data that is entered into the website corresponding to said root number, and at least one other of said extension numbers corresponds to a particular country.

17. A method according to claim 1, wherein said extension number corresponds to a particular country.

18. A method according to claim 1, wherein said extension number corresponds to an ITU country code.

19. A method according to claim 1, wherein said extension number comprises variable data that is entered into the website corresponding to said root number.

20. A method according to claim 1, wherein said root number is registered with a central authority for the internet.

21. A method according to claim 1, further comprising:
subsequent to receiving the root number, receiving the separator character and then receiving data from the wireless device; and
sending the data to the web site.

22. A method according to claim 21, wherein the data is used by the website to perform a query.

23. A method for accessing internet addresses based on a request from a wireless device, the method comprising:
receiving a short-name associated with a particular internet address of a website that a user of the wireless device desires to access from said wireless device, said short-name comprising a root number corresponding to the website;
searching a database for said short-name, said database being located at a location remote from said wireless device; and
if said short-name is found, retrieving said particular internet address so that said wireless device can be connected to said particular internet address,
wherein said short-name comprises in order, a country code indicator sequence, a country code, a separator character, and the root number.

24. A system for accessing internet addresses based on a request from a wireless device, the system comprising:
a database storing relationships between short-names and particular internet addresses of websites, wherein a short-name comprises a root number corresponding to a website, said database being located at a location remote from said wireless device; and
a controller which receives a transmitted short-name of a particular internet address of a website that a user of the wireless device desires to access from said wireless device, said controller operable to search said database for said transmitted short-name, and if said short-name is found, retrieving said particular internet address so that said wireless device can be connected to said particular internet address,
wherein said short-name further comprises a non-numerical separator character and an extension number, said separator character separating said root number from said extension number.

25. A system according to claim 24, wherein said database is accessed over the internet.

26. A system according to claim 24, wherein said database is accessed through a wireless service provider without traversing the internet.

27. A system according to claim 24, wherein said short-name is received by a software application that queries said database.

28. A system according to claim 27, wherein at least one of said software application and said database maps said short-name to an internet URL.

29. A system according to claim 24, wherein multiple short-names can map to a single internet address.

30. A system according to claim 24, wherein said system identifies a transport protocol required to complete said accessing and addresses a sending site in accordance with said transport protocol.

31. A system according to claim 24, wherein if said database indicates that said short-name is not found, said system searches a second database for said short-name.

32. A system according to claim 24, further comprising a plurality of databases, said databases arranged in a logical hierarchy so that if said short-name is not found in a first database, said searching is resubmitted to a next database in said hierarchy.

33. A system according to claim 24, wherein said short-name is input to said wireless device in the form of voice command, and said voice command is converted to a non-voice command after being transmitted by said wireless device.

34. A system according to claim 33, wherein said voice command is converted to a non-voice command by a computer connected to said wireless device via a network.

35. A system according to claim 24, wherein said root number corresponds to a phone number in E. 164 format.

36. A system according to claim 24, wherein said root number corresponds to a phone number.

37. A system according to claim 24, wherein said root number corresponds to an address of the website and said extension number corresponds to a sub-address of the website.

38. A system according to claim 24, wherein said short-name comprises multiple separator codes and multiple extension numbers.

39. A system according to claim 38, wherein at least one of said extension numbers corresponds to variable data that is entered into the website corresponding to said root number, and at least one other of said extension numbers corresponds to a particular country.

40. A system according to claim 24, wherein said extension number corresponds to a particular country.

41. A system according to claim 24, wherein said extension number corresponds to an ITU country code.

42. A system according to claim 24, wherein said extension number comprises variable data that is entered into the website corresponding to said root number.

43. A system for accessing internet addresses based on a request from a wireless device, the system comprising:
a database storing relationships between short-names and particular internet addresses of websites, wherein a short-name comprises a root number corresponding to a website, said database being located at a location remote from said wireless device; and
a controller which receives a transmitted short-name of a particular internet address of a website that a user of the wireless device desires to access from said wireless device, said controller operable to search said database for said transmitted short-name, and if said short-name is found, retrieving said particular internet address so that said wireless device can be connected to said particular internet address, wherein said short-name comprises in order, a country code indicator sequence, a country code, a non-numerical separator character, and the root number.

44. A method of accessing internet addresses using a web-enabled device, the method comprising:

transmitting a short-name, associated with a particular internet address of a website that a user of the wireless device desires to access from said web-enabled device, to a controller to cause the controller to search a database for said short name, wherein said short-name comprises a root number corresponding to the website, and wherein said database being located at a location remote from said web-enabled device; and receiving said particular internet address so that said web-enabled device is connected to said particular internet address, wherein said short-name further comprises a non-numerical separator character and an extension number, said separator character separating said root number from said extension number.

45. A method according to claim 44, wherein said database is accessed over the internet.

46. A method according to claim 44, wherein said database is accessed through a wireless service provider without traversing the internet.

47. A method according to claim 44, wherein said short-name is transmitted to a controller running a software application that queries said database.

48. A method according to claim 47, wherein at least one of said software application and said database maps said short-name to an internet URL.

49. A method according to claim 44, wherein multiple short-names can map to a single Internet address.

50. A method according to claim 44, further comprising:
identifying a transport protocol required to complete said accessing; and
addressing a sending site in accordance with said transport protocol.

51. A method according to claim 44, wherein if said database indicates that said short-name is not found, a second database is searched for said short-name.

52. A method according to claim 44, further comprising a plurality of databases, said databases arranged in a logical hierarchy so that if said short-name is not found in a first database, said searching is resubmitted to a next database in said hierarchy.

53. A method according to claim 44, wherein said short-name is transmitted by said web-enabled device in the form of a voice command.

54. A method according to claim 53, wherein said voice command is converted to a non-voice command by a computer connected to said web-enabled device via a network.

55. A method according to claim 44, wherein said short name corresponds to a phone number in E.164 format.

56. A method according to claim 44, wherein said short name corresponds to a phone number.

57. A method according to claim 44, wherein said root number corresponds to an address of the website and said extension number corresponds to a sub-address of the website.

58. A method according to claim 44, wherein said short-name comprises multiple separator codes and multiple extension numbers.

59. A method according to claim 58, wherein at least one of said extension numbers corresponds to variable data that is entered into the website corresponding to said root number, and at least one other of said extension numbers corresponds to a particular country.

60. A method according to claim 44, wherein said extension number corresponds to a particular country.

61. A method according to claim 44, wherein said extension number corresponds to an ITU country code.

62. A method according to claim 44, wherein said extension number comprises variable data that is entered into the website corresponding to said root number.

63. A method of accessing internet addresses using a web-enabled device, the method comprising:

transmitting a short-name, associated with a particular internet address of a website that a user of the wireless device desires to access from said web-enabled device, to a controller to cause the controller to search a database for said short name, wherein said short-name comprises a root number corresponding to the website, and wherein said database being located at a location remote from said web-enabled device; and receiving said particular internet address so that said web-enabled device is connected to said particular internet address, wherein said short-name comprises in order, a country code indicator sequence, a country code, a non-numerical separator character, and the root number.

64. A method for accessing internet addresses based on a request from a wireless device, the method comprising:

receiving a short-name associated with a particular internet address of a website that a user of the wireless device desires to access from said wireless device, said short-name comprising a root number corresponding to the website;

searching a database for said short-name, said database being located at a location remote from said wireless device; and if said short-name is found, retrieving said particular internet address so that said wireless device can be connected to said particular internet address, prior to receiving the root number, receiving a non-numerical start character from the wireless device, wherein the start character signifies that the root number is to follow.

65. A method according to claim 64, further comprising:
prior to receiving the start character, receiving a country code from the wireless device as part of the short-name.

* * * * *